March 22, 1927.

R. M. LOVEJOY 1,621,732

ROTARY VALVE MECHANISM FOR ENGINES

Filed Oct. 28, 1921    3 Sheets-Sheet 1

Inventor—
Ralph M. Lovejoy.
By— Heard Smith & Tennant.
Attorneys.

March 22, 1927.

R. M. LOVEJOY 1,621,732

ROTARY VALVE MECHANISM FOR ENGINES

Filed Oct. 28, 1921    3 Sheets-Sheet 2

Inventor—
Ralph M. Lovejoy.
By— Heard Smith & Tennant
Attorneys.

Patented Mar. 22, 1927.                BEST AVAILABLE COPY        1,621,732

UNITED STATES PATENT OFFICE.

RALPH M. LOVEJOY, OF MEREDITH, NEW HAMPSHIRE.

ROTARY-VALVE MECHANISM FOR ENGINES.

Continuation of application filed November 14, 1916, Serial No. 131,335, now Patent No. 1,460,722. This application filed October 28, 1921. Serial No. 510,995.

This invention relates to improvements in valve mechanisms for engines and one of the objects thereof is to provide an air-cooled rotary valve for controlling the intake or exhaust of the engine cylinder.

The present application is a continuation of my Patent No. 1,460,722, filed November 14, 1916, for improvements in internal combustion engines.

More specifically the invention relates to improvements in rotary valve constructions for high speed internal combustion engines, such as are used in flying machines, racing automobiles, motor boats, and the like, in which it is necessary to charge the cylinder with an explosive mixture very quickly and correspondingly to exhaust the products of combustion very rapidly. This has heretofore been usually accomplished by providing the cylinders and pistons with large inlet and exhaust ports, and in some instances with a plurality of inlet ports and exhaust ports, or both. The valves for such ports have usually been of the reciprocating type and powerful springs have been required to insure the proper functioning of the valves. When in use the excessive pounding of the valves soon destroys the co-operating faces of the valves and valve seats and causes loss of power by the escape of the unexploded combustible mixture and also the escape of the expanding gases which form the products of combustion. Furthermore, the high degree of heat developed by the rapidly exploding charges and the rapid hammering of the valves soon causes a deterioration of the valve springs which causes them to crystallize and break, thus either reducing the efficiency of the engine or putting them entirely out of commission.

I am aware that rotary valves for internal combustion engines have heretofore been employed, but so far as I am aware all such valves have been fitted in apertures bored in the cylinder walls and are defective in operation because of the unequal expansion, under running conditions, of the valves and the walls by which they are enclosed.

One of the principal objects of the present invention is to provide a rotary valve which will not be enclosed by the cylinder walls and of which a substantial part will be exposed to the air at all times and cooled thereby. Desirably the valve is provided with supplemental heat radiating members to aid in dissipating the heat absorbed by the valve from the burning gases and from the cylinder walls.

Another object of the invention is to provide a novel construction for internal combustion engines in which the cylinder is provided with a single port with which the intake port for the fuel and the superimposed exhaust pipe for the products of combustion may be caused to communicate through suitable ports in the rotary valve.

A further object of the invention is to provide the central shaft of a rotary valve for controlling the port of the cylinder of an internal combustion engine with a thrust bearing adapted to resist the force of the explosion.

A further object of the invention is to provide a rotary valve for internal combustion engines of the type described with means for yieldably supporting the valve out of frictional contact with the valve seat whereby a more free rotation of the valve will be acquired.

These and other objects and features of the invention will more fully appear from the following description and the accompanying drawings and will be pointed out in the claims.

A preferred embodiment of my invention is illustrated more or less diagrammatically in the accompanying drawings as applied to a reciprocating multi-cylinder engine of a usual type, certain of the improvements disclosed in my prior application also being shown.

Figure 1:
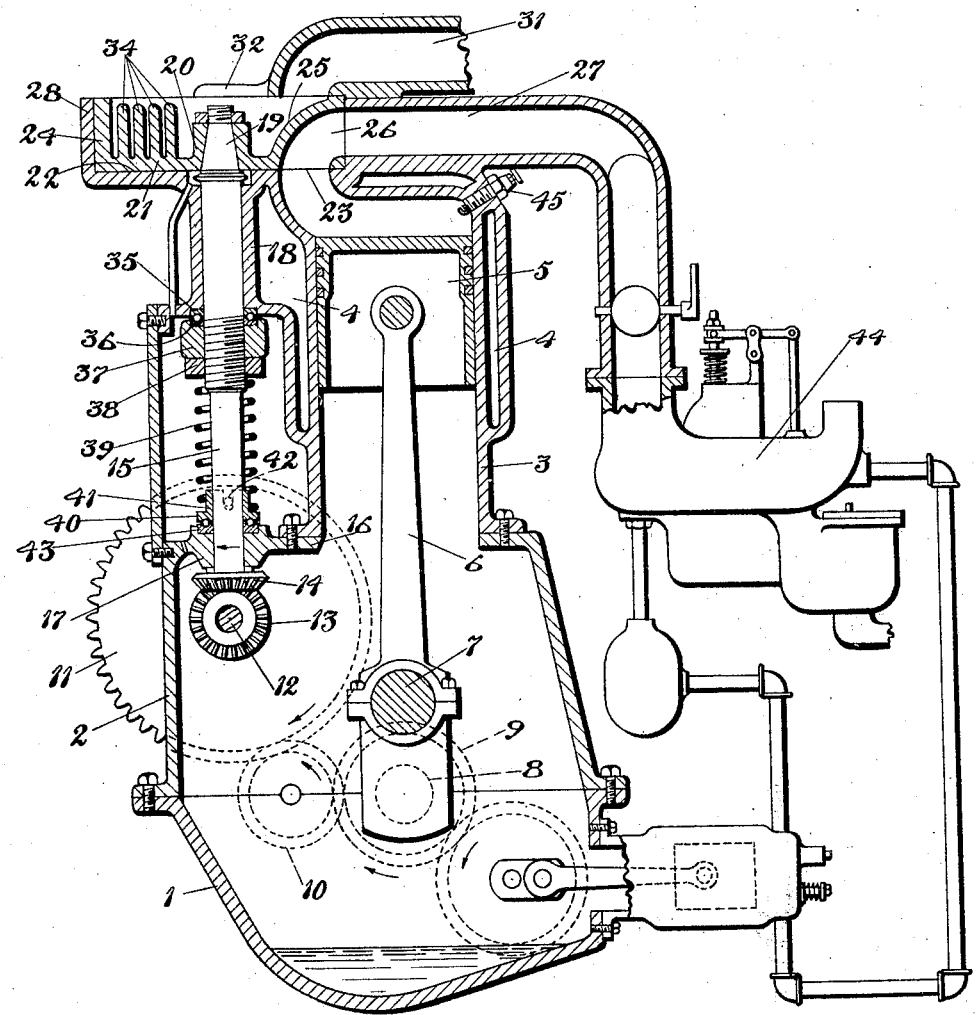
Fig. 1 is a partial vertical sectional view of an engine embodying the invention, the various mechanisms being shown, for convenience of illustration, in the same vertical plane.
Figure 2:
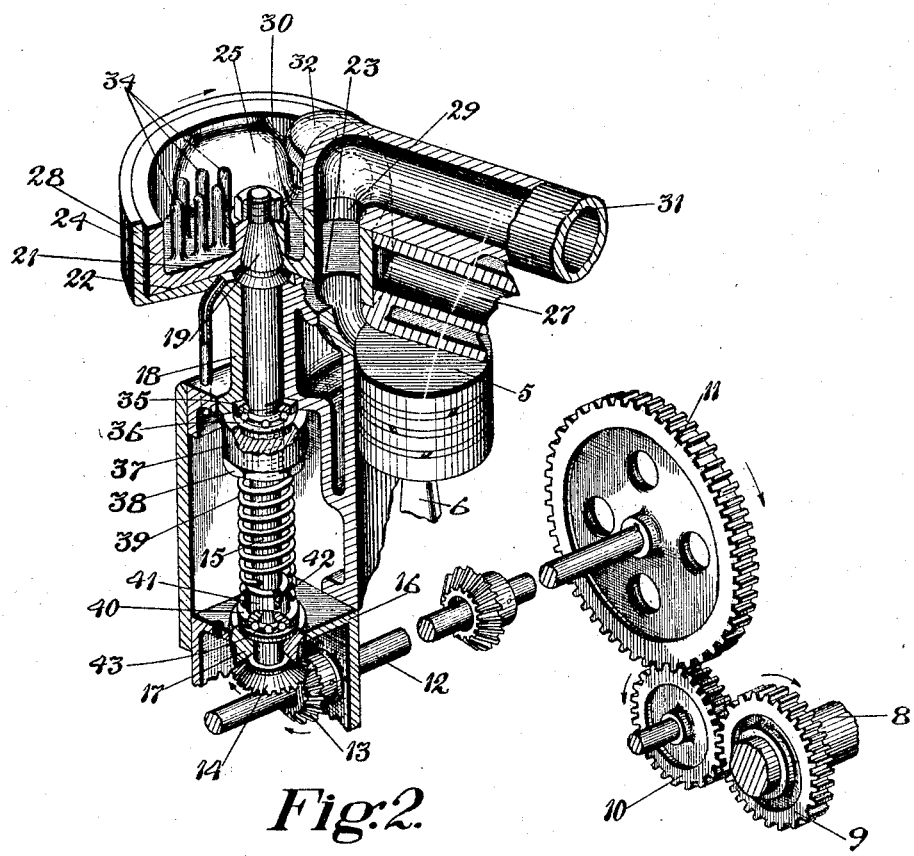
Fig. 2 is a perspective view, mainly in section, of a portion of the cylinder, the intake and exhaust conduits, and the rotary valve in co-operative relation to the exhaust, and illustrating also graphically the means for rotating the valve.
Figure 3:
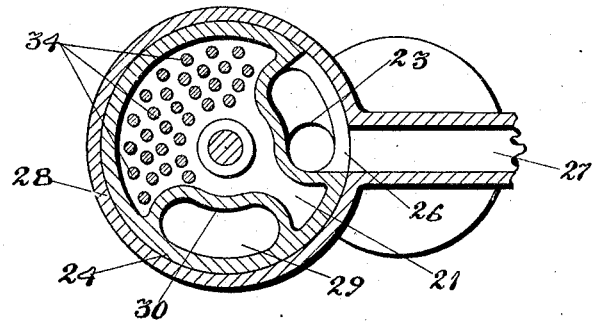
Fig. 3 is a detail horizontal sectional view through the rotary valve and its casing showing the valve establishing communication between the cylinder and intake conduit.
Figure 4:
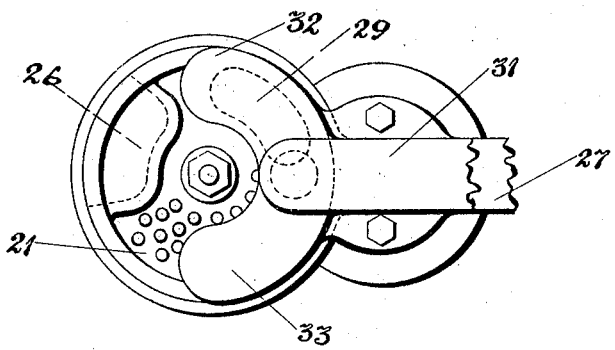
Fig. 4 is a plan view of the cylinder head valve and valve casing showing the position of the valve at the commencement of exhaust.

The illustrative embodiment of the invention shown in the drawings comprises a four-cylinder engine, each of the cylinders of which is equipped with a preferred form of rotary valve mechanism, all of the cylinders being supplied with the hydro-carbon mixture from a usual type of manifold.

Figure 5:
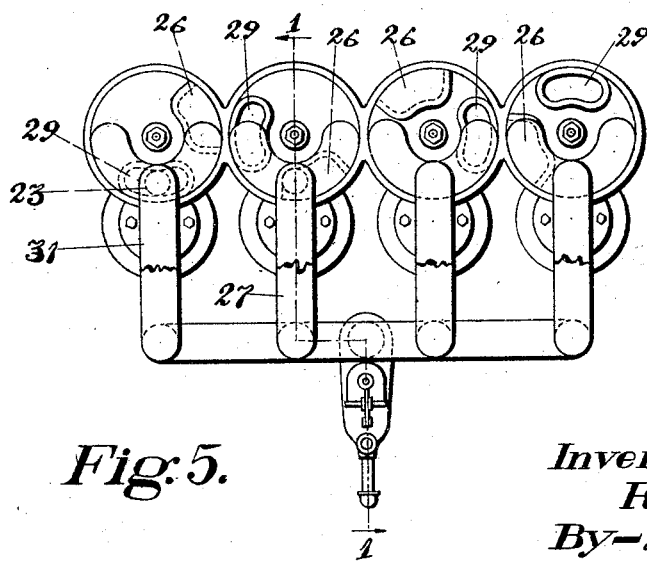
Fig. 5 is a detail plan view of a sufficient portion of the cylinder and rotary valve mechanisms of a multi-cylinder engine to illustrate the application of the present invention thereto.

The engine shown in Fig. 1 of the drawing comprises the usual frame forming a two-part crank case, the lower part 1 of which forms a receptacle for a pool of oil and the upper part 2 of which serves to support the cylinder 3 which is provided with the usual water jacket 4 which desirably extends also across the cylinder head. The piston 5 is connected by the pitman 6 to the crank 7 of the usual crank shaft 8 which is journalled in suitable bearings in the frame (not shown) and serves to transmit the power of the engine in the usual manner. It will, of course, be understood that each of the several cylinders of the engine, as illustrated in Fig. 5, similarly supplies power to the common crank shaft 8. The rotary valve for controlling the supply of fuel to the cylinder, and which also preferably controls the exhaust, is actuated from the crank shaft 8 through a train of gears 9, 10 and 11, the latter of which rotates a shaft 12 which is journalled in suitable bearings in the casing and is provided with a mitre gear 13 which meshes with a complementary mitre gear 14 which is fixedly secured upon a shaft 15 of the rotary valve. The valve shaft or stem 15 desirably is journalled in bearings disposed in parallelism with the axis of the piston, but may be located otherwise to conform to the type of cylinder employed.

As shown herein the upper portion 2 of the crank case is provided with a horizontal flange or web 16 having a boss 17 forming the lower journal for the valve shaft 15 and the outer wall of the water jacket 4 is provided with an elongated boss 18 which forms the upper journal for said shaft. The upper end of the shaft 15 preferably has a conoidal portion 19 which enters a corresponding conoidal recess in the hub 20 of the rotary valve 21, and the valve is secured upon said conical portion by a nut upon the screw threaded end of the valve shaft 15.

The rotary valve preferably is in the form of a disk, the flat under face 22 of which is in co-operative relation to the flat wall of the port 23 of the cylinder. In the preferred construction shown herein the charge is introduced into the cylinder and the products of combustion are discharged from the cylinder through this port. It is preferably much larger than the usual admission or exhaust ports to permit both charging and exhaust of the cylinder quickly through the charging and exhaust ports of the rotary valve. The rotary valve 21 preferably has a vertical annular flange 24 which extends throughout the greater part of its circumference, but merges into a curved web 25 which rises from the base of the valve to its periphery and provides a lateral port 26 adapted to communicate with the end of the intake manifold 27 which preferably extends across the cylinder head and may if desired be cast integral therewith to insure rigidity of construction.

The valve 21 is so designed that the port 26 presents an elongated recess adapted to establish communication between the cylinder port 23 and the intake 27 a sufficient length of time to enable the cylinder to be fully charged at each rotation of the valve. During the remainder of rotation of the valve the flange 24 closes the end of the intake conduit, and the lower face 22 of the valve closes the port of the cylinder. In order to prevent the escape of gaseous fuel from the recess forming the port 26 of the valve an annular wall 28 is provided which fits closely upon the annular flange 24. This annular wall 28 desirably is formed integral with the main body of the cylinder.

The rotary valve 21 is also provided with an exhaust aperture 29 which preferably is in the form of an elongated opening concentric with the axis of the valve. The wall of the exhaust port comprises a portion of the flange 24 and a flange 30 which is continuous therewith and extends upwardly to the same height as the flange 24. The exhaust port thus formed may discharge the products of combustion directly to the atmosphere, but preferably discharges into a suitable exhaust pipe. As illustrated herein the exhaust pipe 31 is in the form of a casting bolted to the cylinder head and provided with lateral extensions 32 and 33 which overlie the valve and extend a sufficient distance to prevent the escape of burning gases by any other course than through the exhaust pipe 31.

Preferably the center of the port of the exhaust pipe is in alinement with the center of the cylinder port so that the products of combustion are discharged directly into the exhaust pipe through a straight and uninterrupted passage.

It will be observed that by reason of the construction herein disclosed the greater part of the valve 21 is exposed to the atmosphere so that it will be air-cooled. In order to increase the radiating surface which is exposed to the atmosphere a number of heat radiating units, such as bosses or vanes 34, are formed integral with or secured to the outer face of the valve. These radiating members may, if desired, be so formed as to reenforce the portion of the valve which is subjected to the shock of explosion. In order to insure freedom of movement of the valve at all times the valve 21 preferably is sustained slightly out of engagement with the valve seat 22, and the force of the explosion is resisted by a thrust bearing which acts upon the stem of the valve. Preferably one of the members of the thrust bearing is made adjustable so that the position of the valve relatively to the valve seat may be accurately adjusted and resilient means acting upon the thrust bearing normally hold the valve out of engagement with the valve seat. It will, of course, be understood that the valve fits very closely adjacent the valve seat so that there will be no appreciable escape of the gaseous fluid introduced into the cylinder, or the products of combustion which are expelled therefrom, and to this end it is desirable that the valve shall be first ground upon the valve seat and then lifted by the resilient means just enough to eliminate frictional engagement between the valve and the valve seat.

In the preferred embodiment of the invention disclosed herein the valve is supported by anti-friction thrust bearings which comprise a bearing ring 35 which is seated in the lower end of the boss 18 and a complementary bearing ring 36 which is seated in an internally screw threaded collar or nut 37 which engages complementary screw threads upon the valve stem 15. By adjusting the collar or nut 37, therefore, the position of the valve relatively to the valve seat may be accurately determined. A lock nut 38 also screwed upon the valve stem 15 serves to lock the collar or nut 37 in adjusted position.

The valve is normally held free from its seat by a helical spring 39 which surrounds the valve stem 15 and at its upper end abuts against the lock nut 38 and at its lower end is seated upon a flange 40 of a sleeve 41 which is slidably mounted upon the valve stem 15 and is connected thereto by a pin 42 seated in said valve stem and extending into a slot in said collar. The lower face of the flange 40 forms the upper race of a ball bearing, the lower race 43 of which is seated in a suitable recess in the boss 17 in which the valve stem 15 is journalled.

An explosive mixture may be supplied to the intake manifold 27 by any suitable means, such as a usual form of carbureter. Preferably, however, the explosive mixture is supplied through a carbureter 44 of the type disclosed in my prior application No. 131,335 aforesaid, now Patent No. 1,460,722.

In the operation of the engine the valve 21 is rotated from the crank shaft at the required speed—which may be either constant or variable according to the type of gearing interposed between the crank shaft and the shaft or stem of the valve—to bring the admission port 26 in communication with the intake 27 just as the piston is about to begin its intake stroke. The port 26 preferably extends peripherally around the valve a sufficient distance to establish communication between the intake conduit and the port of the cylinder during the entire intake stroke of the piston and the flat under face of the valve cuts off such communication immediately at the end of the intake stroke. The piston is then returned by the momentum of the usual rotating parts, thus causing a compression of the explosive mixture which is ignited in the usual manner by the spark from a spark plug 45 which is located at a convenient point in the upper clearance space of the cylinder. At the time the explosion takes place the solid portion of the disk valve between the inlet and outlet ports covers the port of the cylinder and the force of the explosion which is exerted upon the valve is taken up by the thrust bearing between the lower end of the boss 18 and the nut 37 which is secured upon the piston stem or shaft 15. The piston is then driven downwardly upon its working stroke. Upon the exhaust stroke of the piston the valve 21 will have rotated sufficiently to bring the exhaust port of the valve into communication with the port of the exhaust manifold 31 from which it may be conducted either directly to the air or through a muffler.

The present invention is particularly adapted for use in high speed engines in which the pistons reciprocate with great rapidity. The rapid rotation of the valve with its heat radiating unit causes the valve to be cooled rapidly. This radiation is further increased where the engine is applied to a vehicle which travels at a high rate of speed. In fact, the radiation is sufficiently rapid to maintain the valve cool without the necessity of water jacketing it.

By the use of a rotary valve of the character above described the disadvantages arising from the reciprocating valves, such as the wearing away of the valves, the breakage of valve springs, etc., above pointed out, are entirely eliminated. Furthermore, the engine can be driven at any speed since the rotary valve will co-operate properly with the intake and exhaust at any speed which can be obtained by the reciprocating piston.

By holding the valve out of frictional contact with its seat and providing an anti-friction thrust bearing for the valve shafts to absorb the shock imposed upon the valve by the force of the explosion substantially all resistance to the free rotation of the valve is eliminated.

It will be observed that the general construction of the engine and of the valve is exceedingly simple and that the mechanisms can be assembled and replaced without difficulty.

It will be understood that the present embodiment of the invention is of an illustrative character and not restrictive and that various changes in form, construction and arrangement of parts may be made within the spirit and scope of the following claims.

Having thus described my invention, what I claim as new, and desire to secure by Letters Patent, is:

1. An internal combustion engine comprising a cylinder having a single port and an intake conduit arranged to deliver an explosive mixture to said port, an exposed, air-cooled, rotary disk valve having a flat base normally covering said cylinder port and provided with a cylindrical peripheral flange, a conduit leading through said base and flange presenting a port adapted to establish communication between said cylinder port and said intake conduit.

2. An internal combustion engine comprising a cylinder having a single port and an intake conduit arranged to deliver an explosive mixture to said port, an exposed, air-cooled rotary disk valve having a flat base normally covering said cylinder port, and provided with a peripheral flange and a conduit leading through said base and flange presenting a port adapted to establish communication between said cylinder port and said intake conduit and an exhaust port extending directly through the flat base of said valve adapted during the rotation of said valve to register with said cylinder port to permit the discharge of the products of combustion.

3. An internal combustion engine comprising a cylinder having a port, an exposed air-cooled rotary valve having a port adapted to co-operate with said cylinder port and resilient means for supporting said valve out of frictional engagement with the wall of said cylinder port.

4. An internal combustion engine comprising a cylinder having a port presenting a flat wall, a rotary disk valve provided with a flat base in co-operative relation to the flat wall of said cylinder port and having a port adapted to co-operate with said cylinder port and resilient means acting upon said shaft to support said valve out of frictional engagement with the wall of said cylinder port.

5. An internal combustion engine comprising a cylinder having a port, an intake conduit and means to deliver an explosive mixture to said cylinder through said port including a disk valve having a central shaft and provided with a port adapted to co-operate with said cylinder port, a thrust bearing for said shaft adapted to resist the force of the explosion and resilient means rotatable with said shaft for maintaining the members of the thrust bearing in contact and acting also to support the valve out of frictional engagement with the wall of the cylinder port.

6. An internal combustion engine comprising a cylinder having a port, an intake conduit and means to deliver an explosive mixture to said cylinder through said port including a rotary disk valve having a central shaft and provided with a port adapted to co-operate with said cylinder port, a thrust bearing for said shaft adapted to resist the force of the explosion, resilient means for maintaining the members of said thrust bearing in contact and acting also to support said valve out of frictional engagement with the wall of the cylinder port and means for adjusting said thrust bearing whereby said valve may be accurately positioned relatively to said cylinder port.

7. An internal combustion engine comprising a cylinder having a port, an intake conduit for an explosive mixture terminating in juxtaposition to said cylinder port, an exhaust pipe superimposed upon and extending for a distance along said intake conduit and having a mouth in alinement with said cylinder port, a rotatable disk valve having a flat base in co-operative relation to the wall of said intake port and provided with intake and exhaust ports adapted successively to establish communication with said intake conduit and said cylinder and with said exhaust pipe and said cylinder.

8. An internal combustion engine comprising a cylinder having a port, an intake conduit for an explosive mixture terminating in juxtaposition to said cylinder port, an exhaust pipe superimposed upon said intake conduit and having a mouth in alinement with said cylinder port, a rotatable disk valve having a flat base in co-operative relation to the wall of said intake port and provided with intake and exhaust ports adapted successively to establish communication with said intake conduit and said cylinder and with said exhaust pipe and said cylinder, a central shaft for said valve, a thrust bearing for said shaft adapted to resist the force of the explosion and resilient means normally acting to maintain the members of said thrust bearing in contact and also to support said valve out of frictional engagement with the wall of the cylinder port.

In testimony whereof, I have signed my name to this specification.

RALPH M. LOVEJOY.